| (12) | United States Patent | (10) Patent No.: | US 8,882,880 B2 |
|---|---|---|---|
| | Zhang et al. | (45) Date of Patent: | Nov. 11, 2014 |

(54) METHOD FOR CONTROLLING EXTREMELY LOW TI IN EXTRA LOW CARBON ALSI-KILLED STEEL

(75) Inventors: Feng Zhang, Shanghai (CN); Xiao Chen, Shanghai (CN); Jianru Zhu, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 80 days.

(21) Appl. No.: 13/697,777

(22) PCT Filed: Apr. 12, 2011

(86) PCT No.: PCT/CN2011/072654
§ 371 (c)(1),
(2), (4) Date: Nov. 13, 2012

(87) PCT Pub. No.: WO2011/160483
PCT Pub. Date: Dec. 29, 2011

(65) Prior Publication Data
US 2013/0056167 A1 Mar. 7, 2013

(30) Foreign Application Priority Data
Jun. 23, 2010 (CN) .......................... 2010 1 0208286

(51) Int. Cl.
C22C 38/02 (2006.01)
C22C 38/04 (2006.01)
C22C 38/00 (2006.01)
C22C 38/14 (2006.01)
C22C 38/06 (2006.01)
C21C 7/06 (2006.01)
C21C 7/00 (2006.01)
C21C 7/064 (2006.01)
C22C 38/12 (2006.01)
C21C 7/076 (2006.01)
C22C 33/04 (2006.01)
C21B 13/02 (2006.01)

(52) U.S. Cl.
CPC ............... C22C 38/04 (2013.01); C21C 7/0645 (2013.01); C22C 38/02 (2013.01); C22C 38/001 (2013.01); C22C 38/002 (2013.01); C22C 38/14 (2013.01); C22C 38/12 (2013.01); C21C 7/076 (2013.01); C22C 33/04 (2013.01); C22C 38/06 (2013.01); C21C 7/06 (2013.01); C22C 38/004 (2013.01); C21B 13/02 (2013.01)
USPC .................................. 75/384; 75/568; 75/570

(58) Field of Classification Search
CPC ...... C22C 38/004; C22C 38/02; C22C 38/04; C22C 38/01; C22C 38/14; C22C 38/06; C21C 7/06; C21C 7/064; C21C 7/0645; C21C 7/076; C21C 7/068
USPC ............................................ 75/384, 568, 570
See application file for complete search history.

(56) References Cited

FOREIGN PATENT DOCUMENTS

| CN | 101481772 A | | 7/2009 |
|---|---|---|---|
| CN | 101736124 A | | 6/2010 |
| CN | 101748236 A | | 6/2010 |
| JP | 06-256837 | * | 9/1994 |
| JP | 7-173519 A | | 7/1995 |
| JP | 2000-129331 | * | 5/2000 |
| JP | 2002-105578 A | | 4/2002 |
| JP | 2002-322508 A | | 11/2002 |

OTHER PUBLICATIONS

Derwent-Acc-No. 2011-F17464 for the patent family including CN 102002553 A by Chen T et al published Apr. 6, 2011.*
Machine translation CN 102002553 published Apr. 6, 2011.*
Derwent-Acc-No. 2003-798454 for the patent family including KR 2003053142 A by Ahn S B et al published Jun. 28, 2003.*
Machine translation KR 2003053142 published Jun. 28, 2003.*
Machine translation of CN 101748236 published Jun. 1, 2011.*
Machine translation of JP 2000-129331 published May 9, 2000.*
Machine translation of JP 06207212 published Jul. 26, 1994.*
Machine translation JP 06256837 A published Sep. 13, 1994.*
Derwent-Acc-No. 1994-276051 for the patent family including JP 06207212 by Fujii T et al published Jul. 26, 1994.*
International Search Report mailed on Jul. 21, 2011, for PCT Patent Application No. PCT/CN2011/072654, filed on Apr. 12, 2011, 3 pages.

* cited by examiner

*Primary Examiner* — George Wyszomierski
*Assistant Examiner* — Tima M McGuthry Banks
(74) *Attorney, Agent, or Firm* — Kilpatrick Townsend & Stockton LLP

(57) ABSTRACT

The present invention provides a method for controlling extremely low Ti in extra low carbon AlSi-killed steel, the weight percentage of the chemical composition of the extra low carbon AlSi-killed steel comprising: C≤0.005%, Si: 0.1-3.4%, Mn: 0.1-0.5%, P≤0.2%, S≤0.002%, Al: 0-1.2%, N≤0.005%, Ti≤0.0015 and a balance substantially being Fe and inevitable impurities; the liquid steel having said chemical composition is obtained by hot metal preprocessing, smelting, retained RH smelting and ingoting, wherein the top ladle slag is modified, and calcium-aluminum based modifier of 0.6-1.7 kg/t steel are added, so as to ensure a controlling demand that when refined RH decarburization is over, the content of T.Fe in top ladle slag composition ≥5%, the content of $Al_2O_3$≤23%; when refined RH decarburization is over, ferrosilicon, ferroaluminum or ferromanganese is employed to perform deoxide and alloying, then perform a deep desulfurization, and desulfurizing efficiency is 50% to 70%.

4 Claims, 2 Drawing Sheets

METHOD FOR CONTROLLING EXTREMELY LOW TI IN EXTRA LOW CARBON ALSI-KILLED STEEL

This application is a U.S. National Phase under 35 USC 371 of PCT Application No. PCT/CN2011/072654, filed Apr. 12, 2011, which claims priority to Chinese Patent Application No. 201010208286.4, filed Jun. 23, 2010, the disclosures of which are incorporated by reference herein.

FIELD OF THE INVENTION

The present invention relates to a method for manufacturing refined RH (Ruhrstahl Heraeus) desulfurized steel, especially to a method for controlling extremely low Ti in extra low carbon AlSi-killed steel that is deeply desulfurized in RH refining process.

BACKGROUND

Ti possesses a strong avidity to elements O and N. These three elements are easy to combine during steel-making process so as to form minute inclusions, such as $TiO_x$ and TiN etc. These minute inclusions will reduce purity of the steel, resulting in clogging at a continuous casting nozzle or floater in mold, which in turn affects all sorts of performance of the steel. Therefore, a strict standard is demanded on the content of Ti in a part of special steel grades, e.g., electrical steel, bearing steel, spring steel etc., which want no more than 30 ppm, even 15 ppm.

The main traditional methods for reducing content of Ti in steel are as follows.

By strictly controlling content of Ti in raw and auxiliary materials, such as hot metal, ferroalloy, tundish cover etc and top ladle slag, and by means of converter-twined and secondary slag formation etc., dragin of the content of external Ti in steel can be reduced, thereby avoiding increase of the content of Ti after liquid steel deoxidation and alloying. Such a method is disclosed in for example, Japanese Patent Application Laid-open No. 7-173519, No. 2002-322508, No. 2002-105578 and No. 2004-307942. But such a method has a strict demand on quality of the above-described raw and auxiliary materials, which significantly increases manufacturing cost and smelting period of the steel, and in order to prevent $TiO_2$ in top ladle slag from being deoxidized, it is necessary to control the content of aluminum in steel, which is commonly controlled to no more than 0.1%.

Also, by means of modification of the top ladle slag in smelting and refining process, as well as adjustment on basicity of the slag and oxidability of liquid steel, and the like, distribution ratio of Ti between the slag steel can be improved, which is disclosed in for example, Japanese Patent Application Laid-open No. 5-86413 and No. 2003-73726 etc. The disadvantage of this method is that the liquid steel is not desulfurized, and the content of Al in steel is relatively low, which is commonly controlled to no more than 0.1%.

SUMMARY

The object of the present invention is to provide a method for controlling extremely low Ti in extra low carbon AlSi-killed steel, wherein under the circumstance that the contents of Si and Al are relatively high and the content of S is relative low, the quality demand of raw and auxiliary materials in smelting process can be widened, and the steel-making manufacturing process can be simplified, by means of the measure of the modification of the top ladle slag and RH refined deep desulfurization and the like, which has some advantages, for example operating control is simple, manufacturing cost is low, scope of application is wide and control accuracy is high.

In order to obtain the above-described object, technical solution of the present invention is:

deoxidizing and alloying, by utilizing alloy such as ferroaluminum, ferrosilicon or ferromanganese, for example, after decarburization is finished, the contents of carbon and sulfur in finished steel are extremely low, and the content of aluminum thereof is relatively high.

Specifically, in the method for controlling extremely low Ti in extra low carbon AlSi-killed steel of the present invention, weight percentage of chemical composition of the extra low carbon AlSi-killed steel comprising: C≤0.005%, Si: 0.1~3.4%, Mn: 0.1~0.5%, P≤0.2%, S≤0.002%, Al: 0~1.2%, N≤0.005%, Ti≤0.0015 and a balance substantially being Fe and inevitable impurities; the liquid steel having said chemical composition is obtained by hot metal preprocessing, smelting, retained RH smelting and ingoting, wherein the top ladle slag is modified, and calcium-aluminum based modifier of 0.6~1.7 kg/t steel, is added, so as to ensure a controlling demand that when refined RH decarburization is over, the content of T.Fe in top ladle slag composition ≥5%, the content of $Al_2O_3$ ≤23%; when refined RH decarburization is over, ferrosilicon, ferroaluminum or ferromanganese is employed to do deoxiding and alloying, then perform a deep desulfurization with desulfurizing efficiency of 50% to 70%.

Furthermore, the weight percentage of the desulfurizer comprises CaO: 65%-75%, $Al_2O_3$: 15%-30%; $CaF_2$: 0-10%.

Additionally, a method for adding said desulfurizer of the present invention comprises:

if the initial percentage of the sulfur in ladle is 0.0021-0.0025%, the recruitment of desulfurizer is 3.3-4.0 kg/t steel;

if the initial percentage of the sulfur in ladle is 0.0026-0.0030%, the recruitment of desulfurizer is 4.0-6.0 kg/t steel;

if the initial percentage of the sulfur in ladle is 0.0031-0.0045%, the recruitment of desulfurizer is 6.7-9.0 kg/t steel;

if the initial percentage of the sulfur in ladle is 0.0036-0.0040%, the recruitment of desulfurizer is 9.7-12.3 kg/t steel.

The present invention relates to an extra low carbon AlSi-killed steel through refined RH deep desulfurization, the designed principle of chemical composition is as follows:

C is no more than 0.005%. C stunts finished grain severely, which is subjected to result in increase iron less in steel and produce magnetic aging, thus making a following decarburization difficult, so it must be controlled strictly to no more than 0.005%.

Si is 0.1% to 3.4%. Si can improve the electric resistivity of matrix, and reduce iron loss in steel effectively. If the content of Si is higher than 3.4%, the magnetic induction of steel will reduce remarkably, and it is easy to make rolling difficult, whereas lower than 0.1%, the iron loss cannot be reduced.

Mn is 0.1% to 0.5%. Mn and S is combined to form MnS, which can reduce harm to magnetic performance effectively, as well as improve surface state of electrical steel, and reduce hot brittle. Therefore, it is necessary to add no less than 0.1% of the content of Mn, but if the content of Mn is no less than 0.5%, it is subjected to destroy recrystallized texture, and significantly increase the manufacturing cost of steel.

P is no more than 0.2%. Phosphorus can improve workability of steel plate, but if more than 0.2%, it instead makes cold rolling workability of steel plate deteriorated.

S is no more than 0.002%. If the content of S is more than 0.002%, educt, such as MnS etc., will increase significantly, which stunts finished grain severely, and makes the magnetic performance deteriorated.

Al is 0~1.2%. Al is an element to enhance electrical resistance, and also used to deep deoxidized to electrical steel, if the content of Al is higher than 1.2%, continuous casting pouring will become difficult, and the magnetic induction will reduce remarkably.

N is no more than 0.005%. If the content of N is more than 0.005%, educt, such as AlN etc., will increase significantly, which stunts finished grain severely, and makes the magnetic performance deteriorated.

The process of the extremely low extent of Ti in extra low carbon AlSi-killed steel through refined RH deep desulfurization of the present invention is performed as follows:

Full hot metal is employed as steel-making raw material. Smelting process, by controlling lance position and inputting auxiliary materials, ensures that slag-converting condition in converter is good, and decarburization, desulfurization and warming-up effect of liquid steel are stable. At smelting end point, by means of sublance measurement of temperature and sampling, the contents of carbon and oxygen in liquid steel are controlled to 0.03% to 0.05% and 0.04% to 0.08%, respectively. The liquid steel, which satisfies the above-described controlling demands, flows towards next process to perform decarburization and desulfurization; and a small amount of the liquid steel, which does not satisfy the above-described controlling demands, are supplied and amended by means of secondary reblow. Then, in steel tapping process, the top ladle slag is modified, and calcium-aluminum based modifier, 0.6~1.7 kg/t steel, is added, because the calcium-aluminum based modifier is existing product, the description thereof is omitted.

The liquid steel through the above-described steps is deep decarburized in refined RH firstly, the decarburization effect can be monitored by exhaust gas flow in smelting process, until decarburization is over, at this time the content of carbon in liquid steel is no more than 0.005%. Then, ferrosilicon, ferroaluminum or ferromanganese is employed to perform deoxide and alloying with respect to liquid steel, and desulfurizer is employed to perform deep desulfurization with respect to liquid steel.

In desulfurization process, desulfurizer is inputted one-shot from vacuum bunker, the adding amount is defined by the initial content of sulfur in ladle. After adding desulfurizer for 3-5 minutes, the content of sulfur in liquid steel is sampled and analyzed to calculate desulfurizing efficiency. Considering the initial content of sulfur in ladle is generally controlled to 20 to 40 ppm when refined RH is ready to perform, the adding amount of desulfurizer of which desulfurizing efficiency is between 50% to 75% can be obtained in accordance with the actual controlling effect of mass production. In refined RH smelting process, changes of the contents of sulfur and titanium are shown in FIG. 1.

The innovation of the present invention is as follows:

1. the top ladle slag is modified during converter steel tapping process, to maximally improve content of Ti in top ladle slag, so that Ti in slag will not be deoxidized to enter into liquid steel when desulfurization is performed in following refined RH process, eventually obtains a strand that has a lower content of Ti. The key of this operation is the adding amount of calcium-aluminum based modifier in modification of top ladle slag.

It is because the basicity of top ladle slag is relatively high when the normal converter smelting is over, generally larger than 3.0, sometimes even no less than 4.0. Therefore, as to $CaO-SiO_2-Al_2O_3$ slag system, if the adding amount of calcium-aluminum based modifier is lower than 0.6 kg/t steel, the change in top ladle slag composition is not obvious, which does not act a basic modification, namely, does not attain the object of great increase or improvement of the content of Ti in top ladle slag. If the adding amount of calcium-aluminum based modifier is larger than 1.7 kg/t steel, the contents of CaO and $Al_2O_3$ in top ladle slag will increase greatly, after analyzing in accordance with formula (2) and (3), this result will directly affect the content of T.Fe and the activity of FeOx in top ladle slag, thus shift the reaction in formula (1) to the left, which is disadvantageous to the control of the content of Ti in steel.

$$x[Ti]+2(FeO_x)=x(TiO_2)+2[Fe] \quad (1)$$

The activity of FeOx and activity coefficient thereof in formula (1) can be expressed as:

$$lg\frac{a_{[O]}}{a_{(FeO_x)}} = -\frac{6320}{T} + 2.765 \quad (2)$$

$$lg\gamma_{FeO_x} = \frac{0.676 \times w(MgO) + 0.267 \times w(Al_2O_3) - 19.07}{w(SiO_2) + 0.0214 \times w(CaO) - 0.047} \quad (3)$$

Furthermore, blowing mechanism, refractory materials and the like are substantially invariable, as well as the basicity of slag and the content of MgO are relatively invariable, therefore, if the contents of CaO and $Al_2O_3$ in top ladle slag are relatively high, the melting point and viscosity of the slag will increase greatly, so as to reduce the distribution ration of Ti between slag and steel. The distribution ratio of Ti between slag and steel under the influence of slag composition is shown in FIGS. 2 and 3.

2. After adding desulfurizer for 3-5 minutes, the content of sulfur in liquid steel is sampled and analyzed, to calculate desulfurizing efficiency of liquid steel so as to confirm whether the controlling demand that desulfurizing efficiency satisfies is between 50 to 75% is satisfied, and to estimate the content of Ti in strand in advance, by sampling and analyzing the content of sulfur in liquid steel through desulfurization, on the premise that the initial content of sulfur is known.

The object of controlling desulfurizing efficiency strictly is that, the desulfurization to liquid steel influences remarkably the distribution ratio of Ti between slag and steel, therefore, the main composition of the added desulfurizer is CaO, which can be consumed as reaction product, so that shift formula (4) and (5) to the right. $CaF_2$ in desulfurizer improves the fluidity of the molten slag, which is of advantage to the progress of the above-described reaction.

$$x(CaO)+y(Al_2O_3)=(xCaO \cdot yAl_2O_3) \quad (4)$$

$$x(CaO)+y(Al_2O_3)+z(SiO_2)=(x\ CaO \cdot y\ Al_2O_3 \cdot zSiO_2) \quad (5)$$

Generally, if desulfurizing efficiency is lower than 50%, because the adding amount of desulfurizer is relatively low, formula (4) and (5) eventually can not be effectively shifted to the right, and namely can not effectively reduce the content of $Al_2O_3$ in slag; and if desulfurizing efficiency is more than 75%, as known from formula (3), the oxidability of slag will reduce remarkably, also being adverse to improve the distribution ratio of Ti between slag and steel.

Top ladle slag and liquid steel are in one reaction vessel in the smelting process, so Ti coexists in slag and steel. The higher the distribution of Ti in slag and steel is, the higher the content of Ti in top ladle slag is and the lower the content of Ti in liquid steel is, whereas the lower the distribution of Ti in slag and steel is, the lower the content of Ti in top ladle slag is and the higher the content of Ti in liquid steel is. The distribution ratio of Ti between slag and steel under the influence of desulfurizating efficiency is shown in FIG. 4.

The present invention bases on the fact that by controlling modification effect and desulfurization effect, the distribution ratio of Ti between slag and steel can be controlled, so as to avoid the increase of Ti in liquid steel. Namely, the controlling demands of modification effect and desulfurization effect are different from the traditional controlling demands of modification effect and desulfurization effect. Generally, modification is not performed to converter steel tapping, and the slag composition is not restricted, as well as the lower the desulfurization effect is, the better the desulfurization effect is.

DETAILED DESCRIPTION

Figure 1:
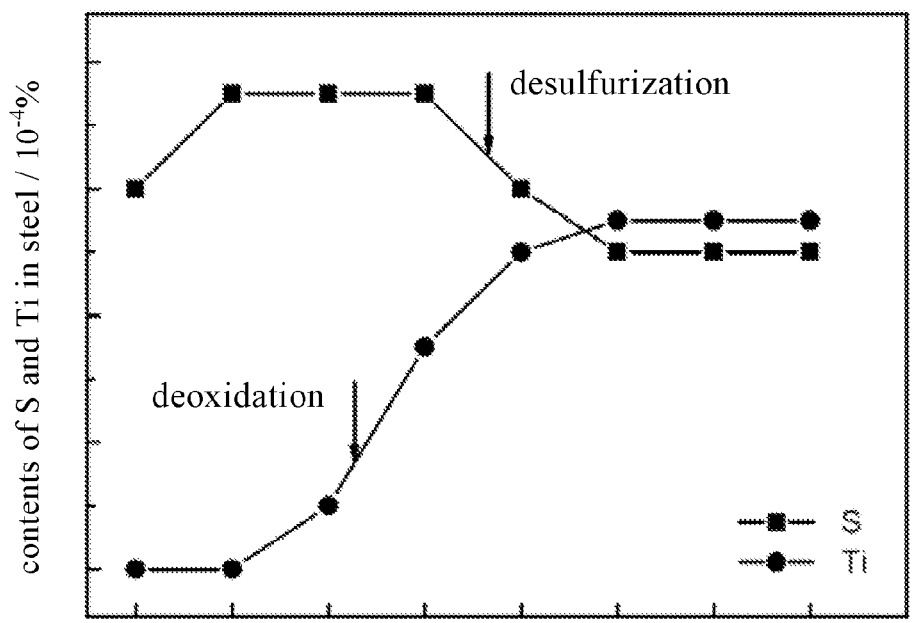
FIG. 1 is a schematic view of the content change of S and Ti in refined RH smelting process.
Figure 2:
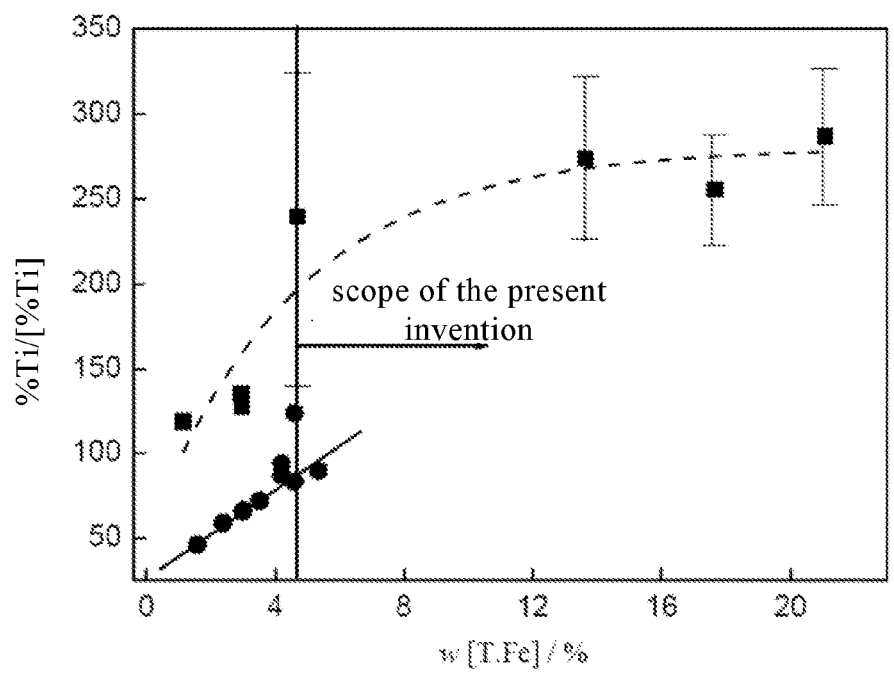
FIG. 2 is a schematic view of the relation between the content of T.Fe in slag and the distribution ratio of Ti.
Figure 3:
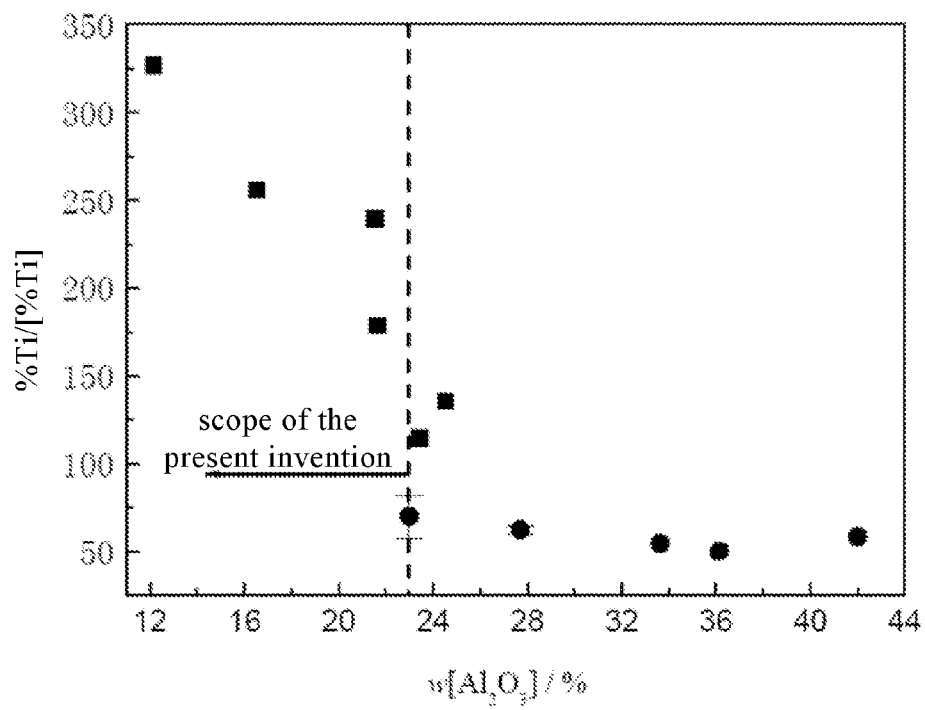
FIG. 3 is a schematic view of the relation between the content of $Al_2O_3$ in slag and the distribution ratio of Ti.
Figure 4:
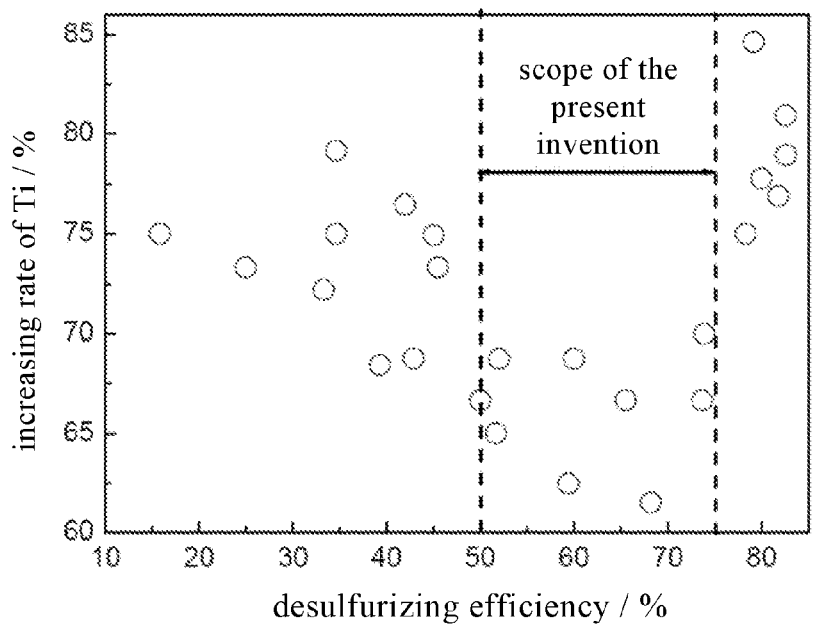
FIG. 4 is a schematic view of the relation between the refined RH desulfurizating efficiency and the increment rate of Ti.

Hereinafter, the present invention will be described in connection with embodiments.

Hot metal and scrap steel is mixed in proportion, deep desulfurization is made after smelted with a 300-ton converter, refined RH decarburization, deoxide and alloying, then a strand that has thickness of 170 mm to 250 mm and width of 800 mm to 1400 mm can be obtained after degasification and continuous casting, the control situation of the content of Ti in steel can be seen in Table 1.

In this embodiment, the chosen desulfurizer is formed by a mixture of 70% lime and 30% fluorite, the lime in desulfurizer utilizes a good quality lime that has a high activity and a low content of carbon, in which the content of CaO is no less than 90% and the activity is no less than 350 N·L, the fluorite utilizes a good quality fluorite, in which the content of $CaF_2$ is no less than 95%.

It can be seen from Table 1 that in each comparative example, the content of Ti in strand is larger than 15 ppm, while in each embodiment of the present invention, the content of Ti in strand is less than 15 ppm. The control effect to the content of Ti in strand is substantially independent from the content of element Si, Mn, Al, P or the like, while is mainly subjected to be affected by alumina ($Al_2O_3$), total iron (T.Fe) and desulfurizing efficiency $\eta S$ in top ladle slag. If the controlling demands that the content of T.Fe in top ladle slag composition is no less than 5% and the content of $Al_2O_3$ is no more than 23%, and the controlling demand that desulfurizing efficiency is 50% to 75%, are satisfied simultaneously when refined RH decarburization is over, the content of Ti in strand can be controlled effectively. Also, if the content of T.Fe is no more than 12%, the higher the content of T.Fe is, the better the control effect to Ti is, but if the content of T.Fe is higher than 12%, there is no obvious variety in the control effect to Ti; then, if the content of $Al_2O_3$ is no more than 23%, the lower the content of $Al_2O_3$ is, the better the control effect to Ti is, but if the content of $Al_2O_3$ is higher than 23%, the control effect to Ti sudden drops; also, the best scope of desulfurizing efficiency is 50% to 75%, it is disadvantageous to the control effect to Ti if desulfurizing efficiency is higher than 75% or lower than 50%, and the control effect to Ti sudden drops especially if desulfurizing efficiency is higher than 75%.

In actual manufacturing procedure, only when these three controlling demands are satisfied simultaneously, the content of Ti in strand can be controlled effectively, all of them are indispensable. Further, when in the best scope of desulfurizing efficiency (50% to 75%), the higher the content of T.Fe is and the lower the content of $Al_2O_3$ is, the better the control effect to Ti is.

The present invention can reduce the content of Ti in extra low carbon AlSi-killed steel without the increase of the manufacturing cost, by controlling the chemical composition of top ladle slag and optimizing the refined RH desulfurizating process.

TABLE 1

| embodiments | C | Si | Mn | P | S | Al | N | Ti | $Al_2O_3$ | T•Fe | $\eta_S$ |
|---|---|---|---|---|---|---|---|---|---|---|---|
| | | | | | | | | | (unit: weight percentage) | | |
| 1 | 0.0021 | 0.748 | 0.396 | 0.02 | 0.0024 | 0.699 | 0.0021 | 0.0008 | 14.13 | 7.46 | 50.0 |
| 2 | 0.0016 | 0.298 | 0.247 | 0.09 | 0.0024 | 0.374 | 0.0021 | 0.0011 | 22.13 | 5.64 | 52.0 |
| 3 | 0.0029 | 1.483 | 0.494 | 0.02 | 0.0016 | 0.682 | 0.0011 | 0.0009 | 21.46 | 9.41 | 53.3 |
| 4 | 0.0017 | 2.015 | 0.281 | 0.01 | 0.0013 | 0.342 | 0.0028 | 0.0008 | 20.32 | 14.42 | 53.6 |
| 5 | 0.0036 | 3.043 | 0.254 | 0.01 | 0.0011 | 0.429 | 0.0013 | 0.0012 | 16.61 | 14.23 | 56.0 |
| 6 | 0.0033 | 0.332 | 0.291 | 0.11 | 0.0014 | 0.341 | 0.0019 | 0.0009 | 14.32 | 6.36 | 56.3 |
| 7 | 0.0014 | 2.848 | 0.197 | 0.02 | 0.0017 | 0.942 | 0.0013 | 0.0010 | 19.65 | 6.89 | 58.8 |
| 8 | 0.0041 | 2.151 | 0.263 | 0.02 | 0.0009 | 0.384 | 0.0013 | 0.0010 | 22.03 | 6.92 | 60.7 |
| 9 | 0.0009 | 2.381 | 0.248 | 0.03 | 0.0008 | 0.393 | 0.0015 | 0.0012 | 21.54 | 7.38 | 63.6 |
| 10 | 0.0008 | 0.794 | 0.481 | 0.06 | 0.0016 | 0.714 | 0.0016 | 0.0009 | 13.43 | 5.01 | 72.1 |
| 11 | 0.0016 | 3.218 | 0.291 | 0.14 | 0.0005 | 0.574 | 0.0010 | 0.0010 | 14.52 | 8.63 | 72.2 |
| 12 | 0.0020 | 2.835 | 0.381 | 0.21 | 0.0006 | 0.499 | 0.0012 | 0.0013 | 21.93 | 6.64 | 72.7 |
| comparative example 1 | 0.0014 | 0.226 | 0.294 | 0.11 | 0.0032 | 0.291 | 0.0018 | 0.0026 | 38.75 | 1.94 | 20.3 |
| comparative example 2 | 0.0016 | 0.723 | 0.526 | 0.02 | 0.0022 | 0.712 | 0.0011 | 0.0024 | 18.47 | 6.49 | 37.1 |
| comparative example 3 | 0.0024 | 2.015 | 0.266 | 0.01 | 0.0028 | 0.316 | 0.0011 | 0.0018 | 22.13 | 8.31 | 41.4 |
| comparative example 4 | 0.0018 | 1.436 | 0.247 | 0.05 | 0.0018 | 0.282 | 0.0016 | 0.0018 | 26.33 | 4.13 | 51.4 |
| comparative example 5 | 0.0023 | 2.632 | 0.206 | 0.03 | 0.0010 | 0.333 | 0.0015 | 0.0018 | 11.92 | 2.10 | 61.5 |
| comparative example 6 | 0.0032 | 3.047 | 0.216 | 0.02 | 0.0004 | 1.096 | 0.0009 | 0.0036 | 27.18 | 6.11 | 81.8 |

What is claimed is:

1. A method for producing Al—Si-killed steel having a chemical composition by weight percentage of C≤0.005%, Si: 0.1-2.4%, Mn: 0.1-0.5%, P≤0.2%, S≤0.002%, Al: 0-1.2%, N≤0.005%, Ti≤0.0015% and a balance substantially being Fe and inevitable impurities; the method comprising obtaining the steel having the said chemical composition by hot metal preprocessing and smelting with the steps of, forming a top ladle slag containing sulfur during smelting, performing decarburization of the steel, modifying the top ladle slag by adding a calcium-aluminum based modifier of 0.6-1.7 kg/t steel to control a content of total iron (T.Fe) in the top ladle slag composition at ≥5% by weight percentage and a content of $Al_2O_3$ at ≤23% by weight percentage after decarburization, employing ferrosilicon, ferroaluminum and ferromanganese to perform deoxidation and alloying, performing deep desulfurization using a desulfurizer having a desulfurizing efficiency of 50% to 70%, and ingoting the steel.

2. The method for producing Al—Si-killed steel having the content of Ti≤0.0015% of claim 1, characterized in that, the weight percentage of the desulfurizer comprises CaO: 65%-75%, $Al_2O_3$: 15%-30%; $CaF_2$: 0-10%.

3. The method of claim 2, characterized in that, a method for adding said desulfurizer comprises:

if the sulfur in ladle is in an initial percentage of 0.0021-0.0025%, the amount of desulfurizer is 3.3-4.0 kg/t steel;

if the sulfur in ladle is in an initial percentage 0.0026~0.0030%, the amount of desulfurizer is 4.0-6.0 kg/t steel;

if the sulfur in ladle is in an initial percentage 0.0031~0.0045%, the amount of desulfurizer is 6.7-9.0 kg/t steel;

if the sulfur in ladle is in an initial percentage 0.0036~0.0040%, the amount of desulfurizer is 9.7-12.3 kg/t steel.

4. The method for producing Al—Si-killed of claim 1, characterized in that, a method for adding said desulfurizer comprises:

if initial percentage of sulfur in ladle is 0.0021-0.0025%, amount of desulfurizer is 3.3-4.0 kg/t steel;

if the initial percentage of the sulfur in ladle is 0.00260.0030%, amount of desulfurizer is 4.0-6.0 kg/t steel;

if the initial percentage of the sulfur in ladle is 0.00310.0045%, amount of desulfurizer is 6.7-9.0 kg/t steel;

if the initial percentage of the sulfur in ladle is 0.00360.0040%, amount of desulfurizer is 9.7-12.3 kg/t steel.

* * * * *